United States Patent
Heath

(10) Patent No.: US 7,466,039 B2
(45) Date of Patent: Dec. 16, 2008

(54) REDUCING OSCILLATIONS IN SYSTEM WITH FOLDBACK CURRENT LIMIT WHEN INDUCTIVE LOAD IS CONNECTED

(75) Inventor: Jeffrey Lynn Heath, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 323 days.

(21) Appl. No.: 11/522,409

(22) Filed: Sep. 18, 2006

(65) Prior Publication Data

US 2008/0068771 A1   Mar. 20, 2008

(51) Int. Cl.
*H01H 27/42*   (2006.01)

(52) U.S. Cl. ..................................................... 307/104
(58) Field of Classification Search ................. 307/104
See application file for complete search history.

(56) References Cited

FOREIGN PATENT DOCUMENTS

| AT | 500 587 A1 | 2/2006 |
|---|---|---|
| WO | WO 2006/081166 A2 | 8/2006 |

OTHER PUBLICATIONS

International Search Report and Written Opinion of the International Searching Authority, issued in International Patent Application No. PCT/US2007/020217, dated May 6, 2008.

*Primary Examiner*—Robert L. DeBeradinis
(74) *Attorney, Agent, or Firm*—McDermott Will & Emery LLP

(57) ABSTRACT

System and methodology for driving an inductive load using a pass device for providing hot swap connection to the load. A current limit circuit prevents current supplied to the load from exceeding a current threshold. A foldback circuit controls the current limit circuit to reduce the current threshold when a voltage across the pass device is above a prescribed value. A filter circuit is coupled to the foldback circuit for reducing oscillations when the inductive load is connected to the pass device.

20 Claims, 5 Drawing Sheets

REDUCING OSCILLATIONS IN SYSTEM WITH FOLDBACK CURRENT LIMIT WHEN INDUCTIVE LOAD IS CONNECTED

TECHNICAL FIELD

This disclosure relates to power supply systems, and more particularly, to circuitry and methodology for reducing oscillations in a system with a foldback current limit, such as a Power over Ethernet (PoE) system, when an inductive load is being connected.

BACKGROUND ART

Electronic systems may have plug-in modules, such as boards or cards, that may be removed from, and inserted into, a live backplane. Each plug-in module usually has a local hot swap controller, ensuring that power is safely applied to that module during both rigorous hot-swap events, and steady-state conditions. The hot swap controller allows a module to be safely inserted to and removed from a live backplane.

For example, a Power over Ethernet (PoE) system uses a hot swap arrangement for connecting or disconnecting a Powered Device (PD) to or from Power Sourcing Equipment (PSE). Traditionally, network devices such as IP phones, wireless LAN access points, personal computers and Web cameras have required two connections: one to a LAN and another to a power supply system. The PoE system eliminates the need for additional outlets and wiring to supply power to network devices. Instead, power is supplied over Ethernet cabling used for data transmission.

The PoE system must comply with the IEEE 802.3af standard that defines delivering power over unshielded twisted-pair Ethernet wiring from a PSE to a PD located at opposite sides of a link. As defined in the IEEE 802.3af standard, PSE and PD are non-data entities allowing network devices to supply and draw power using the same generic cabling as is used for data transmission. A PSE is the equipment electrically specified at the point of the physical connection to the cabling, that provides the power to a link. A PSE is typically associated with an Ethernet switch, router, hub or other network switching equipment or midspan device. A PD is a device that is either drawing power or requesting power. PDs may be associated with such devices as digital IP telephones, wireless network access points, PDA or notebook computer docking stations, cell phone chargers and HVAC thermostats.

The main functions of the PSE are to search the link for a PD requesting power, optionally classify the PD, supply power to the link if a PD is detected, monitor the power on the link, and disconnect power when it is no longer requested or required. A PD participates in the PD detection procedure by presenting a PoE detection signature defined by the IEEE 802.3af standard.

If the detection signature is valid, the PD has an option of presenting a classification signature to the PSE to indicate how much power it will draw when powered up. A PD may be classified as class 0 to class 4. A PD of class 1 requires that the PSE supplies at least 4.0 W, a PD of class 2 requires that the PSE supplies at least 7.0 W, and a PD of class 0, 3 or 4 requires at least 15.4 W. Based on the determined class of the PD, the PSE applies the required power to the PD.

A pass device, such as a MOSFET, may act as a switch between a circuit card being connected to the PSE and the live backplane, i.e. between the PSE and the PD. After the PD is plugged in, i.e. in a startup mode, or during short-circuit conditions, power dissipation in the MOSFET may be much higher than power dissipation when nominal power is provided. To limit the power dissipation, a foldback mechanism is prescribed by the IEEE 802.3af standard. In particular, the standard defines that in a startup mode, for port voltages between 10V and 30V, the minimum requirement for an output current ($I_{Inrush}$) is 60 mA. For port voltages above 30 V, the current $I_{Inrush}$ in a startup mode is required to be in the range from 400 mA to 450 mA. This 400 mA to 450 mA $I_{Inrush}$ requirement applies for duration of the 50 ms to 75 ms $T_{LIM}$ timer.

FIG. 1 shows a diagram that graphically illustrates the IEEE 802.3af foldback requirements. In particular, the gray areas in FIG. 1 show combinations of PSE output voltages and output currents that are not allowed by the IEEE 802.3af standard. The black line in FIG. 1 illustrates a possible foldback curve representing the output current of the PSE at a level between 400 mA and 450 mA for output voltages above 30V and gradually reduced for output voltages below 30V. The current limit foldback technique is used to limit dissipation power, and therefore, size and cost of the pass device.

Some emerging applications, such as PoE, require a foldback mechanism to limit the inrush and short circuit currents for inductive loads. In particular, the IEEE 802.3af standard allows a valid PD to have input inductance up to 100 µH. However, when inductive loads are being connected, hot swap devices with a foldback mechanism may become unstable during the inrush and/or short circuit conditions resulting in oscillations at points of hot swap connection.

Therefore, it would be desirable to provide circuitry and methodology for reducing oscillations in a system with a foldback current limit, such as a Power over Ethernet (PoE) system, when an inductive load is being connected.

SUMMARY OF THE DISCLOSURE

The present disclosure offers a novel system and methodology for driving an inductive load using a pass device for providing hot swap connection to the load. A current limit circuit prevents current supplied to the load from exceeding a current threshold. A foldback circuit controls the current limit circuit to reduce the current threshold when a voltage across the pass device is above a prescribed value. A filter circuit is coupled to the foldback circuit for reducing oscillations when the inductive load is connected to the pass device.

The filter circuit may include a low-pass filter coupled in series with the foldback circuit. The low-pass filter may be configured for attenuating signals at frequencies above a resonant frequency of the load.

In accordance with an exemplary embodiment, the filter circuit may be coupled to an input of the foldback circuit. In particular, it may be arranged between the foldback circuit and the pass device.

Alternatively, the filter circuit may be coupled to an output of the foldback circuit. For example, it may be arranged between the foldback circuit and the current limit circuit.

In accordance with another aspect of the disclosure, a system for providing power over a communication link comprises a power supply device for providing power to a load over the communications link. The power supply device may be configured to supply power via a semiconductor device. A current limit circuit prevents an output current of the power supply device from exceeding a current threshold. A foldback circuit reduces the current threshold when an output voltage of the power supply device is less than or equal to a prescribed output voltage value. A filter circuit is coupled to the foldback circuit for reducing oscillations when an inductive load is connected to the power supply device.

The power supply device may include Power Sourcing Equipment (PSE) for providing power to a Powered Device (PD) over an Ethernet link.

The filter circuit may be configured for reducing oscillations at the semiconductor device when the PD is connected to the PSE. In particular, the filter circuit may include a low-pass filter coupled in series with the foldback circuit. The low-pass filter is configured for attenuating signals at frequencies higher than a resonant frequency of the PD.

The filter circuit may be coupled between the foldback circuit and the semiconductor device.

Alternatively, the filter circuit may be arranged between the foldback circuit and the current limit circuit.

In accordance with a method of the present disclosure, the following steps are carried out to reduce oscillations at a pass device when an inductive load is connected to an electronic system via the pass device:

preventing current supplied to the load from exceeding a current threshold, controlling the current threshold by a foldback circuit to reduce the current threshold when a voltage across the pass device is above a prescribed value, and filtering a signal at the foldback circuit to attenuate frequencies higher than a resonant frequency of the load.

The load may be connected to the system via a communication link coupled to the pass device.

For example, an input signal of the foldback circuit may be filtered to attenuate frequencies higher than a resonant frequency of the load.

Alternatively, an output signal of the foldback circuit may be filtered to attenuate frequencies higher than a resonant frequency of the load.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using the example of a PoE system. It will become apparent, however, that the concepts described herein are applicable to any system for driving a connectable inductive load.

Figure 2:
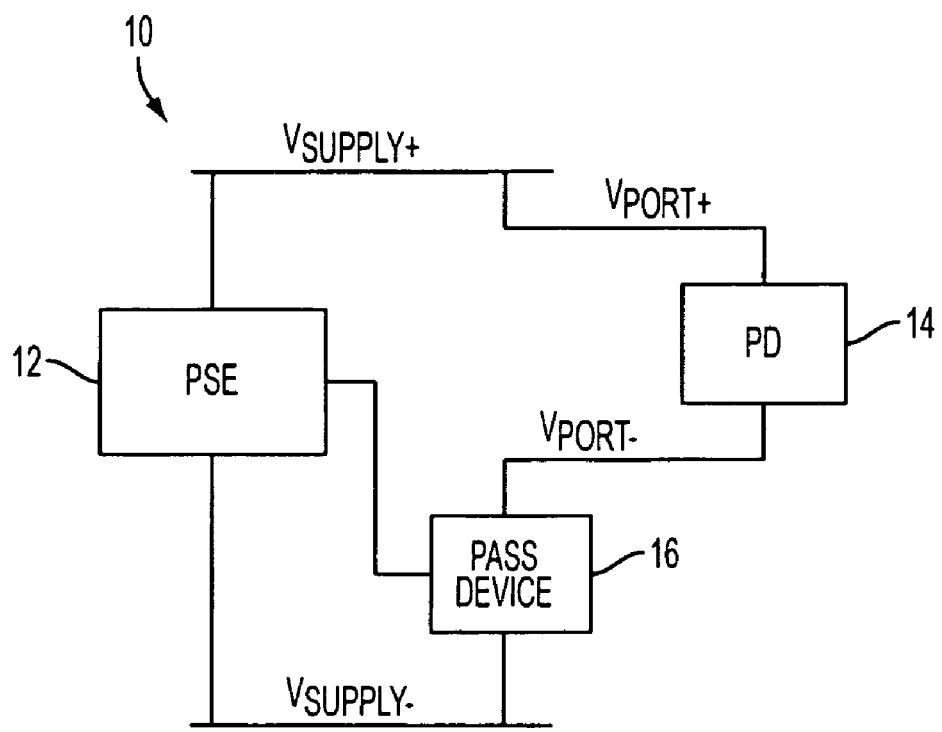
FIG. 2 is a diagram illustrating voltages applied in a PoE system of the present disclosure between a PSE and a PD.

FIG. 2 schematically illustrates voltages applied in a PoE system 10 between a PSE 12 and a PD 14. In particular, a PSE power supply may include positive terminal $Vsupply_+$ and negative terminal $Vsupply_-$. The PSE 12 may include a pass device 16, such as a power MOSFET, for connecting and disconnecting the PD 14 to and from the PSE 12. The gate of the power MOSFET 16 may be controlled to supply power from the PSE 12 to the PD 14. An output port of the PSE 12 may include positive terminal $Vport_+$ and negative terminal $Vport_-$. The port voltage $Vport=Vport_+-Vport_-$ provided at the output of the PSE 12 is applied across the PD 14 to deliver the power $P_{PD}=(Vport_+-Vport_-)\times Iport$, where Iport is a port current. The power Ppass dissipated by the pass device is equal to $Vpass \times Iport$, where $Vpass=Vsupply_- - Vport_-$ is the voltage applied across the pass device 16. When the voltage Vport across the PD 14 decreases, the voltage Vpass across the pass device 16 increases.

When the PD 14 is being connected to the PSE 12, i.e. in a start-up mode, and during short-circuit conditions, power dissipation in the pass device 16 may be much higher than power dissipation when nominal power is provided. To limit the power dissipation, a foldback mechanism is prescribed by the IEEE 802.3af standard. In particular, the standard defines that for port voltages Vport between 10V and 30V, the minimum requirement for an output current ($I_{Inrush}$) in the startup mode is 60 mA. For port voltages Vport above 30 V, the minimum $I_{Inrush}$ requirement is in the range from 400 mA to 450 mA. The minimum $I_{Inrush}$ requirement applies for duration $T_{LIM}$ set in the range between 50 ms and 75 ms.

Figure 3:
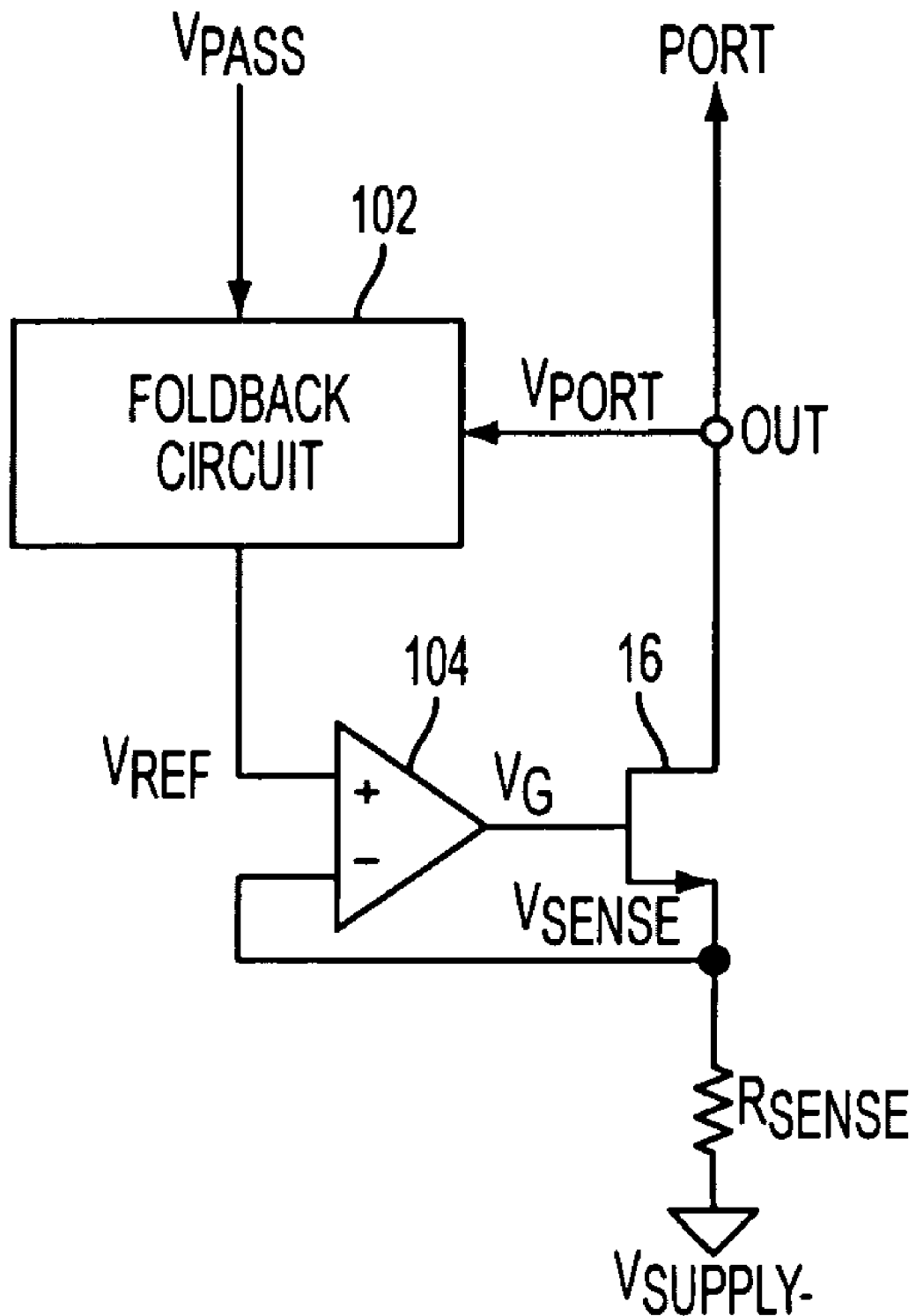
FIG. 3 is a diagram illustrating a foldback mechanism.

As shown in FIG. 3, the foldback mechanism may comprise a foldback circuit 102 that controls a current limit circuit 104 so as to control the port current (Iport) of the PSE 12 in accordance with foldback requirements. In particular, the current limit circuit 104 monitors the port current Iport and compares it with a current limit threshold to maintain the port current Iport at or below the current limit threshold.

The port current Iport may be monitored by determining sense voltage Vsense across sense resistor Rsense connected to the pass device 16, such as a MOSFET. The current limit circuit 104 may comprise an operational amplifier that compares the determined sense voltage Vsense with a reference voltage Vref representing the current limit threshold to maintain the sense voltage at or below the Vref voltage. More specifically, the output of the operational amplifier may be connected to the gate of the MOSFET 16 to decrease gate drive voltage $V_G$ at the gate when the sense voltage Vsense increasing with an increase in the port current approaches the reference voltage Vref. As a result, the resistance of the MOSFET 16 increases, reducing the port current Iport.

Figure 1:
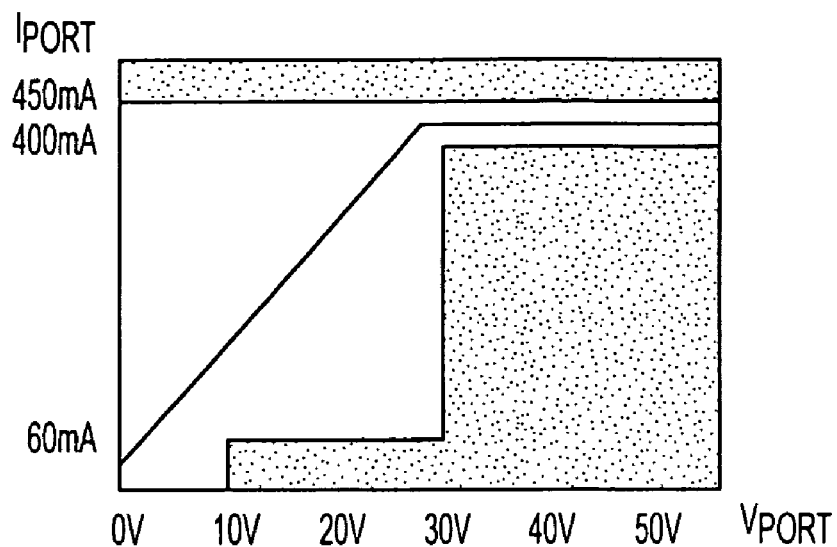
FIG. 1 is diagram illustrating the IEEE 802.3af foldback requirements.

The current limit circuit 104 is controlled by the foldback circuit 102 that may change the voltage Vref so as to achieve a required value of Iport. The foldback circuit 102 monitors the voltage $Vport=Vport_+-Vport_-$ applied across the PD 14, and/or the voltage $Vpass=Vport_- - Vsupply_-$ applied across the pass device 16. In particular, in order to reduce the port current Iport, the foldback circuit 102 may monitor the port voltage Vport and/or the voltage Vpass across the pass device 16 to reduce the current limit threshold when Vport is less or equal a prescribed Vport value, and/or when Vpass exceeds a prescribed Vpass value. For example, the foldback circuit 102 may operate in accordance with the IEEE 802.3af foldback requirements illustrated in FIG. 1.

The PD 14 connected to the PSE 12 may represent an inductive load. For example, the IEEE 802.3af standard requires a valid PD to have input inductance up to 100 µH. Connection of an inductive load to the pass device 16, may cause instability during the inrush and/or short circuit conditions.

Figure 4:
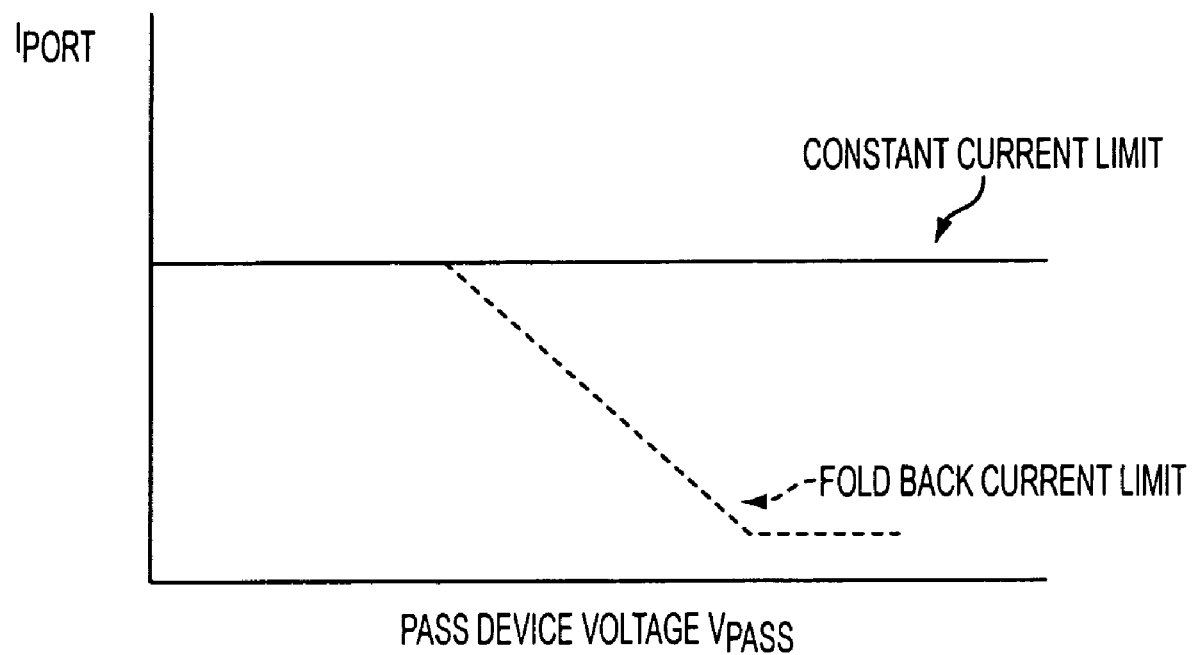
FIG. 4 is a diagram illustrating a foldback current limit curve exhibiting negative resistance.

More specifically, FIG. 4 illustrates a current limit curve representing a foldback scheme that limits power dissipation of the pass device 16 in a startup mode. When the voltage Vpass across the pass device is above a prescribed value, the port current Iport increases with the decrease of the voltage Vpass. Hence, the current limit curve has a slope that exhibits negative resistance. Connection of an inductive load to a device that exhibits negative resistance often causes instability resulting in oscillations at the point of connection. In the case of hot swap connection, this instability is undesirable and may cause oscillations at a point of hot swap connection.

Figure 5:
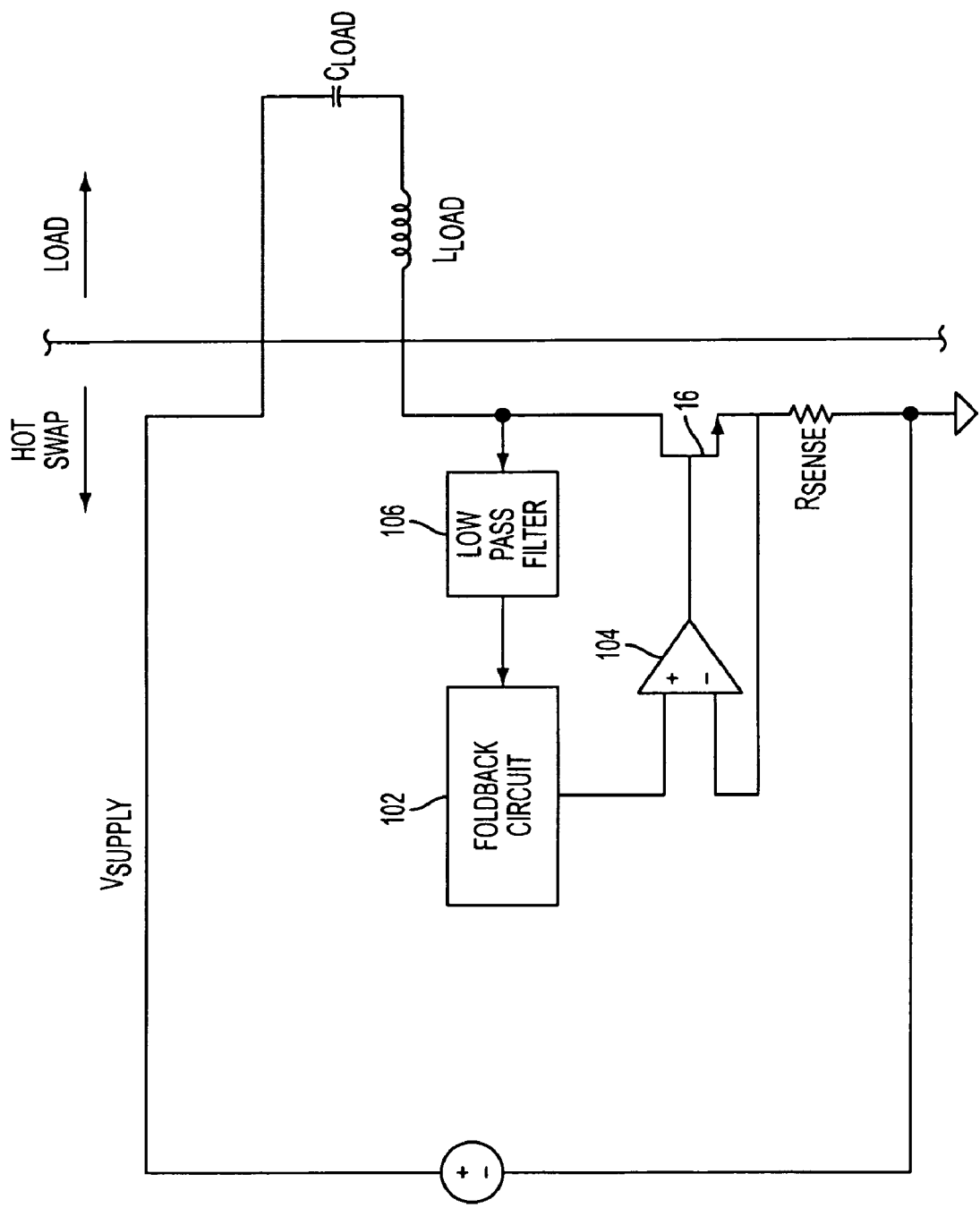
FIG. 5 is a diagram illustrating a first exemplary embodiment of the disclosure.

As shown in FIG. 5 that schematically illustrates hot swap connection of the PD 14 to the PSE 12, the PD 14 may have inductance $L_{LOAD}$ and capacitance $C_{LOAD}$. To reduce oscillations caused by the inductance of the PD 14, the PSE 12 may include a low-pass filter 106 coupled in series with the foldback circuit 104. The low-pass filter 106 may have the cutoff frequency equal to a resonance frequency Fr of a load, such as the PD 14. Hence, the low-pass filter 106 is configured for passing signals at frequencies at or below the resonance frequency Fr, and for attenuating signals at frequencies above the resonance frequency Fr.

For example, the low-pass filter 106 may be arranged between the input of the foldback circuit 102 and the output of the pass device 16 coupled to the PD 14. Hence, the low-pass filter 106 may filter a signal monitored by the foldback circuit 102 to attenuate components at frequencies above the resonance frequency Fr. Thereby, the low-pass filter 106 reduces oscillations at the hot swap connection point caused by inserting an inductive load into a hot swap device exhibiting negative resistance.

Figure 6:
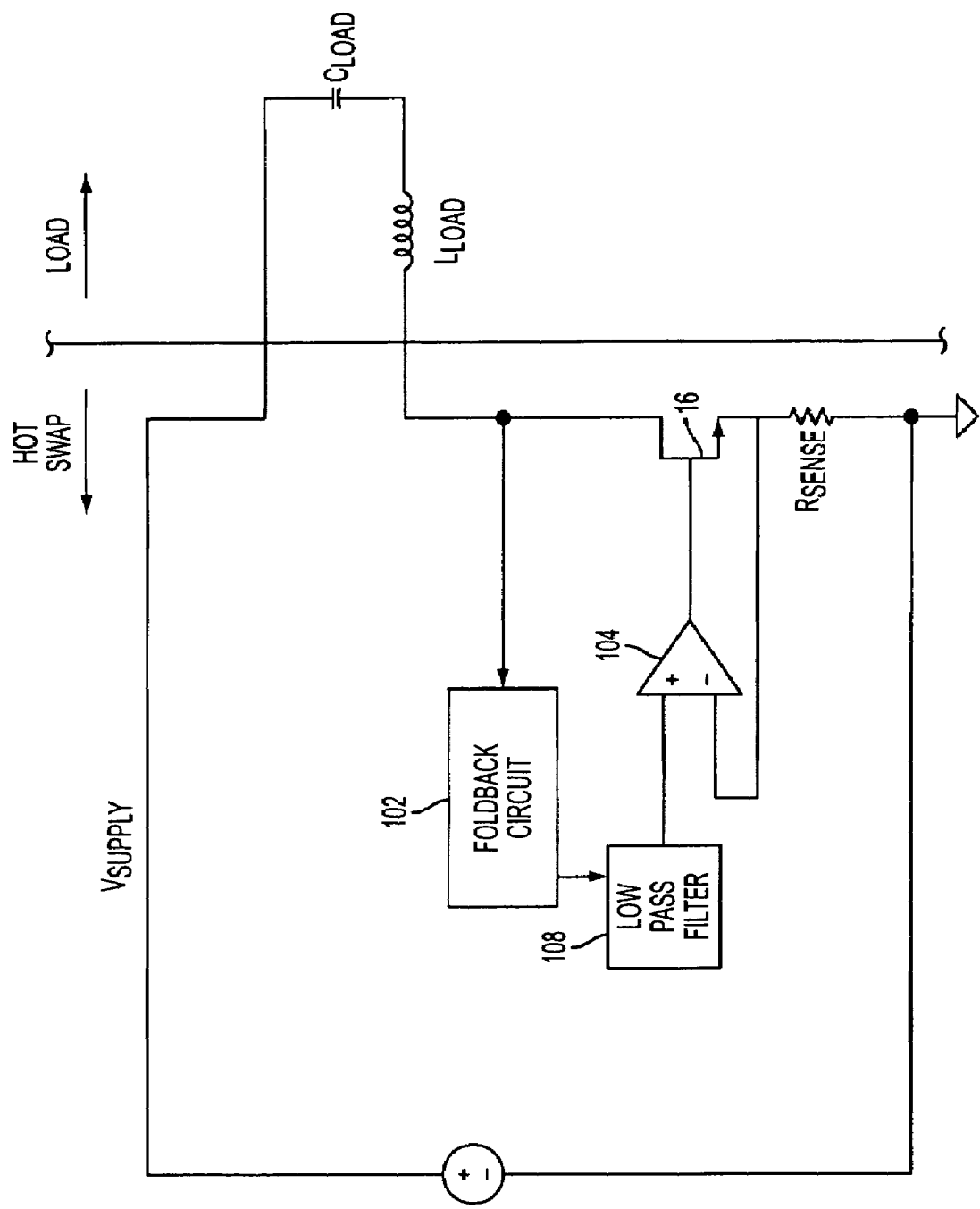
FIG. 6 is a diagram illustrating a second exemplary embodiment of the disclosure.

FIG. 6 illustrates an alternative example of hot swap connection between the PD 14 and the PSE 12, in which a low-pass filter 108 is arranged between the output of the foldback circuit 102 and the current limit circuit 104. Similarly to the example in FIG. 5, the cutoff frequency of the low-pass filter 108 may be equal to the resonance frequency Fr of the PD 14. Therefore, the low-pass filter 108 filters a foldback signal supplied by the foldback circuit 102 to attenuate high-frequency components at frequencies above the resonance frequency of the load. As the filtered foldback signal defines a current limit threshold in a portion of the current limit curve that exhibits negative resistance, the low-pass filter 108 reduces oscillations at the hot swap connection point caused by connecting an inductive load to the PSE 12.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A system for driving an inductive load, comprising:
   a pass device for connecting the load,
   a current limit circuit for preventing current supplied to the load from exceeding a current threshold,
   a foldback circuit configured to control the current limit circuit to reduce the current threshold when a voltage across the pass device is above a prescribed value, and
   a filter circuit coupled to the foldback circuit for reducing oscillations when the inductive load is connected to the pass device.

2. The system of claim 1, wherein the filter circuit includes a low-pass filter coupled in series with the foldback circuit.

3. The system of claim 2, wherein the low-pass filter is configured for attenuating signals at frequencies higher than a resonant frequency of the load.

4. The system of claim 3, wherein the filter circuit is coupled to an input of the foldback circuit.

5. The system of claim 4, wherein the filter circuit is coupled between the foldback circuit and the pass device.

6. The system of claim 3, wherein the filter circuit is coupled to an output of the foldback circuit.

7. The system of claim 6, wherein the filter circuit is coupled between the foldback circuit and the current limit circuit.

8. A system for providing power over a communication link, comprising:
   a power supply device for providing power to a load over the communications link, the power supply device being configured to supply power via a semiconductor device,
   a current limit circuit for preventing an output current of the power supply device from exceeding a current threshold,
   a foldback circuit for reducing the current threshold when an output voltage of the power supply device is less than or equal to a prescribed output voltage value, and
   a filter circuit coupled to the foldback circuit for reducing oscillations when the load is connected to the power supply device.

9. The system of claim 8, wherein the power supply device includes Power Sourcing Equipment (PSE) for providing power to a Powered Device (PD) over an Ethernet link.

10. The system of claim 9, wherein the filter circuit is configured for reducing oscillations at the semiconductor device when the PD is connected to the PSE.

11. The system of claim 8, wherein the filter circuit includes a low-pass filter coupled in series with the foldback circuit.

12. The system of claim 11, wherein the low-pass filter is configured for attenuating signals at frequencies higher than a resonant frequency of the PD.

13. The system of claim 12, wherein the filter circuit is coupled to an input of the foldback circuit.

14. The system of claim 13, wherein the filter circuit is coupled between the foldback circuit and the semiconductor device.

15. The system of claim 12, wherein the filter circuit is coupled to an output of the foldback circuit.

16. The system of claim 15, wherein the filter circuit is coupled between the foldback circuit and the current limit circuit.

17. A method of reducing oscillations at a pass device when an inductive load is connected to an electronic system via the pass device, including the steps of:

preventing current supplied to the load from exceeding a current threshold, controlling the current threshold by a foldback circuit to reduce the current threshold when a voltage across the pass device is above a prescribed value, and filtering a signal at the foldback circuit to attenuate frequencies higher than a resonant frequency of the load.

18. The method of claim 17, wherein an input signal of the foldback circuit is filtered to attenuate frequencies higher than a resonant frequency of the load.

19. The method of claim 17, wherein an output signal of the foldback circuit is filtered to attenuate frequencies higher than a resonant frequency of the load.

20. The method of claim 17, wherein the load is connected to the system via a communication link coupled to the pass device.

* * * * *